Patented Oct. 2, 1945

2,385,932

UNITED STATES PATENT OFFICE 2,385,932

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,830

9 Claims. (Cl. 260—78)

This invention relates to a new class of unsaturated esters of unusual properties which render them valuable in various chemical arts.

The present case is a continuation-in-part of Serial No. 361,280, filed October 15, 1940, by Irving E. Muskat and Franklin Strain.

Because of the indefinite scope and variation in the common usage of certain chemical expressions, it is necessary to define and limit such expressions which are used in the following specification and claims.

The term "polyhydroxy compound" is intended to include all compounds having two or more hydroxy groups and which do not contain any free acid groups. These polyhydroxy compounds may have ether, thioether, amino, amido, or ester linkages between the reactive hydroxy groups. By ester linkage we mean a linking oxygen atom derived by inter-reaction of an alcohol group and an acid group. Thus, a carbonate

contains two ester linkages.

By "simple polyhydroxy compounds" we mean polyhydroxy compounds which do not contain ester linkages between the reactive hydroxy groups such as resorcinol, ethylene glycol, glycerine, etc. Polyhydroxy ethers such as diethylene glycol, tripropylene glycol, and the corresponding thioethers are considered to be simple polyhydroxy compounds. The polyhydroxy compounds which contain ester linkages between the reactive hydroxy groups such as ethylene glycol mono lactate

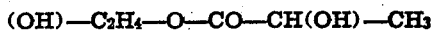

diethylene glycol diglycolate

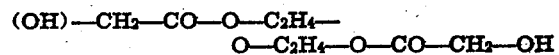

or castor oil are not considered to be within the scope of the term "simple polyhydroxy compound" due to the presence of one or more ester linkages between the hydroxy groups in such compounds.

The invention is particularly directed to esters of unsaturated alcohols having up to five carbon atoms in the molecule such as allyl, methallyl, crotyl, isocrotyl, propargyl, methyl ethynyl carbinyl, methyl vinyl carbinyl, tiglyl, angelyl, or ethylallyl alcohols. The halogen substituted products of the above alcohols are also useful as 2-chloroallyl, bromoallyl and chlorocrotyl alcohols. Although the esters of the lower weight alcohols are preferred, the esters of other alcohols, having up to ten carbon atoms may be used, such as esters of cinnamyl alcohol, phenyl propargyl alcohol, β-allyl ethynyl carbinol, geraniol, linalool, or β-isobutyl allyl alcohol.

The new esters are the polyesters of the simple polyhydroxy compounds including the glycols such as ethylene glycol, propylene glycol or other 1,2 - alkylene glycol, trimethylene glycol, 1,4-butylene glycol, pentamethylene glycol, alpha methyl pentamethylene glycol, or methyl ether of glycerol, the polyglycols such as di-, tri-, or tetraethylene glycol, di-, tri-, or tetrapropylene glycol or the corresponding polyglycerols, the higher polyhydroxy alkanes, such as glycerol, glycerol monochlorhydrin, pentaerythritol, glycerol monoacetate, erythrose, pinacol, xylose, cellulose, or partial esters or ethers thereof such as cellulose mono- or diacetate or the mono- or diethyl ether of cellulose, cellulose monocrotonate, cellulose mono- or dibutyrate, polyvinyl alcohol, dextrose, lactose, or sucrose, and the cyclic polyhydroxy compounds such as quinol, hydroquinone, resorcinol, pyrogallol, hydroxy quinol, naphthaquinone, tetra-, penta-, and hexahydroxy benzenes, orcinol, 1,3-xylyl alcohol or catechol.

A preferred group of these esters are those in which all or at least two of the hydroxy groups of a polyhydroxy compound are esterified with the half ester of carbonic acid and unsaturated alcohol. These neutral esters may be represented by the general formula:

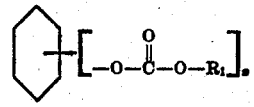

in which $R_1$ is the radical derived from an unsaturated alcohol and $x$ is a small whole number greater than one and less than four. These esters contain the radical of only a single molecule of the polyhydroxy compound and contain four ester linkages between a pair of alcohol radicals.

The carbonate esters herein contemplated may be prepared by reaction of an unsaturated chloroformate such as allyl, methallyl, crotyl, or similar chloroformate with the polyhydroxy compound. Likewise, these esters may be prepared in many cases by reaction of the polychloroformates of polyhydroxy compounds such as the polychloroformate of glycol, resorcinol, pyrogallol, etc., with an unsaturated alcohol. The chloroformates themselves may be formed by reaction of phosgene with the alcohol, preferably at or about 0° C.

The reaction to form the ester is preferably conducted in the presence of a suitable alkaline agent such as pyridine, sodium or potassium hydroxide, bicarbonate, or carbonate, calcium, barium, strontium, or magnesium hydroxide, oxide, bicarbonate or carbonate or other agent capable of removing HCl which is formed during the reaction. This esterification may be conducted in the presence of aqueous or non-aqueous diluents or solvents such as acetone, dioxane, benzene, chloroform, etc.

The present application is especially directed to the esters of polyhydroxy alicyclic compounds such as resorcinol, hydroquinone, pyrogallol, naphthaquinol, or other polyhydroxy benzenes, anthracenes, naphthalenes, phthalyl alcohol, polyhydroxy cyclopentanes, polyhydroxy cyclooctanes, and thus, resorcinol or resorcinol monoacetate, pyrogallol diacetate, etc., and the corresponding propionates, butyrates, caproates, etc., may be reacted with the chloroformates of unsaturated alcohols in accordance with the present invention.

The new unsaturated carbonates are generally non-resinous compounds having distinct boiling and melting points and are often capable of separation in substantially pure state. Frequently, the impurities are side reaction products which are colorless and transparent esters having characteristics similar to the esters herein contemplated. In such cases removal of such impurities may be unnecessary where they do not produce any detrimental effect in the use to which the ester is put. The new compounds are usually liquids at room temperature but some, however, are solids. The new unsaturated compounds are usually miscible with solvents such as benzene, toluene, chloroform, diethyl ether, carbon tetrachloride, and petroleum ether. The monomeric esters are valuble as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, and acetone peroxides, to yield solid or liquid compositions of widely differing physical properties. The polymerized products vary in properties depending upon the structure of the ester and upon the degree of polymerization.

The polyunsaturated esters contain at least two radicals derived from unsaturated alcohol and are capable of polymerization to a fusible intermediate stage and finally to a substantially infusible and/or insoluble form. The completely polymerized polyunsaturated compounds are, in general, substantially unaffected by acids, alkalies, water, and organic solvents. Intermediate polymers derived from the polyunsaturated esters having a wide range of properties may be secured by incomplete polymerization. The polymers thus obtained are transparent and colorless, although they may at times have a slightly yellow cast, especially when polymerized completely. Many of these new polymers are generally tougher and more resistant to shattering than are the unsaturated alcohol esters of polybasic acids.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released this polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable while for acetone peroxide, temperatures of 140–150° C. may be used. In accordance with one modification, the gel, after it is freed from the mold, may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst, such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Cast polymers may also be prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinyl chloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate then may be carefully laid on top taking care to avoid the trapping of air bubbles under the top plate. When the top plate is in position, both plates may be held together by means of suitable clamps which are capable of applying pressure upon the plates and are placed directly over the flexible retainer. The entire assembly is then placed in an oven and heated at 70 to 100° C. where the polymerization is continued. During the polymerization the resin shrinks and tends to draw away from the glass surfaces. To prevent fractures, pressure is maintained upon the plates to depress the flexible container and permit the plates to remain in contact with the polymerizing resin. This pressure may be maintained by periodically tightening the clamps or by use of spring clamps which maintain a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer containing one to four percent residual peroxide is then poured in slowly until the entire mold is filled. After standing until all of the entrapped air has separated the mold is heated uniformly between 70 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized it is separated from the glass plates and a hard, transparent, colorless and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the fusible polymers of the new unsaturated esters are produced by heating the monomer or a solution thereof in the presence of substantial quantities, for example, 2 to 5 percent of benzoyl peroxide until the viscosity of the solution has increased about 100 to 500 percent. This may require from one-half to two hours while heating at 65 to 85° C., in the presence of benzoyl peroxide. The resulting viscous solution is poured into an equal volume of water, methyl or ethyl alcohols, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohols, polyallyl alcohols, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers, or pigments such as zinc oxide, calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids, or di-, or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, cloth, wood, leather or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble infusible state.

Other molding powders may be prepared from the new esters without first converting them to the soluble intermediate polymer. For example, the monomer may be mixed directly with a suitable filler such as magnesium carbonate, cellulose pulp, asbestos, etc., in a ball mill or other mixing device. By proper selection of proportions a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature, 50 to 70° C., for a limited period of time, for example, one to three hours. This precuring operating is a partial polymerization and permits formation of a drying molding powder where the same proportion of monomer might result in a moist molding composition.

Further details of the synthesis of these new esters and of their applications will be apparent from the following examples:

Example I

Allyl chloroformate was prepared by placing 500 cc. of allyl alcohol in a flask equipped with a stirring device and bubbling phosgene through it at such a rate as would permit a rapid reaction without raising the temperature above 10 to 15° C. The flask was provided with an ice bath. When approximately a molar quantity of phosgene had been added the reaction was discontinued and the crude material was permitted to stand at room temperature to separate the excess phosgene. The reaction mixture was washed with water to remove the excess allyl alcohol and the allyl chloroformate was distilled in vacuum (b. p. 46–51 at 80 mm.).

One mol (120 gms.) of allyl chloroformate was added slowly to 53 gms. of diethylene glycol, and 100 gms. of pyridine. The chloroformate addition required about one-half hour during which time the reaction mass was maintained between +5 and +15° C. The resulting mixture was washed with dilute HCl and with water and purified by distillation in a vacuum. The resulting diethylene glycol bis (allyl carbonate) had an index of refraction ($N_D{}^{20}$) of 1.4486, a density of $D_4{}^{20}$=1.132—1.140 and the following structure:

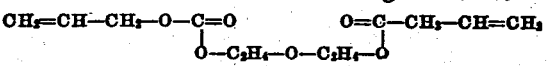

A quantity of 100 gms. of this compound was heated at 50° C. in a solution of 200 cc. of carbon tetrachloride with 2 percent benzoyl peroxide until the viscosity had increased about 200 percent. 500 cc. of methyl alcohol were added and a gummy polymer was precipitated. After filtering and drying, a 5 gm. sample of the soft polymer was mixed with 5 percent benzoyl peroxide and pressed in a mold at a pressure of 2000 lbs. per sq. in. at a temperature of 150° C. A hard, colorless, transparent polymer was produced.

Example II

Methallyl chloroformate was prepared by passing phosgene into 500 cc. of methallyl alcohol at a rate of 50–65 millimoles per minute. The mass was stirred throughout the reaction and maintained at a temperature between 5° C. and 10° C. by means of an ice bath. When approximately an equimolar quantity of phosgene had been absorbed the reaction was stopped and the product was washed with dilute hydrochloric acid and salt solution (NaCl). The methallyl chloroformate was distilled at 126–136° C. (760 mm.). 134 gms. of the chloroformate was added dropwise to 31 gms. of ethylene glycol and an excess (100 gms.) of pyridine. The temperature was maintained below +10° C. during the reaction by means of an ice bath. The ethylene glycol bis (methallyl carbonate)

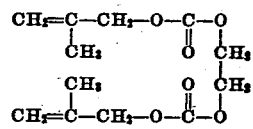

was distilled at 146° C. (2 mm.). It has an index of refraction ($n_D{}^{20}$) of 1.4489 and a density ($d_4{}^{20}$) of 1.103.

A 100 gm. sample of the monomer was suspended in 250 cc. of dioxane and heated at 65° C. for 2 hours. The viscosity had increased appreciably but the mass was still liquid. A half-liter of methyl alcohol was added to precipitate the fusible polymer which was filtered and dried. The polymer was a soft gummy material and after drying it was a non-viscous granular solid.

A five gram sample was mixed with five percent benzoyl peroxide and pressed in a mold at 150° C. and 2000 pounds per square inch pressure. A colorless, transparent solid polymer was formed.

Example III 7.2 moles of allyl chloroformate was added dropwise to a solution of 2 moles of glycerine in 7.8 moles of pyridine while cooling the reaction mixture to a temperature of 10 to 15° C. After the chloroformate had been added, the mixture was allowed to stand at room temperature for about 45 minutes. The products were washed with water and recovered as in Example I. The glyceryl tris (allyl carbonate) thus obtained was a colorless liquid having an index of refraction ($N_D^{20}$) of about 1.4558 and a density ($d_4^{20}$) of about 1.194. The probable formula of this compound is:

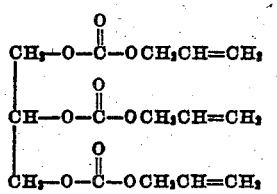

Example IV

A sample of 120 gms. of methyl glycerine and 500 cc. of benzene were placed in a 2000 cc. flask with 250 gms. of pyridine. While the mixture was being stirred, 350 gms. of methallyl chloroformate was added at a rate sufficiently slow to prevent the temperature from rising about 50° C. When the addition was completed the water layer was separated and the oil layer was washed with dilute HCl and with water. The carbon tetrachloride was evaporated by heating at 50–60 mm. total pressure. The ester was mixed with 500 cc. benzoyl and 5 grams benzoyl peroxide and heated at 50° C. At the end of three hours the viscous solution was poured into 1000 cc. of methyl alcohol and a large quantity of a gelatinous polymer was precipitated.

A five-gram sample of the dried polymer was mixed with five percent benzoyl peroxide. It was heated (160° C.) in a mold under 1500 pounds per square inch pressure. A hard, translucent and nearly colorless solid was produced. The monomer had the following structure:

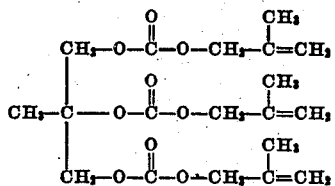

Example V

Phosgene was bubbled into a flask containing allyl alcohol at a rate of 20 millimoles per minute while agitating the mixture and cooling to a temperature below about 15 to 20° C. After phosgene in the proportion of about 0.9 moles of phosgene per mole of allyl alcohol had been introduced, the mixture was allowed to stand for one hour. Thereafter, the reaction mixture was washed with water to remove unreacted allyl alcohol and dried over calcium chloride.

2.2 moles of allyl chloroformate was added dropwise to a solution of one mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until neutral. Thereafter, the product was washed with water and dried over calcium chloride. The ethylene glycol bis (allyl carbonate) having a boiling point of about 118–122° C. at 1 mm., an index of refraction of about ($N_D^{20}$) 1.4443, a density ($d_4^{20}$) about 1.114, and having the probable formula:

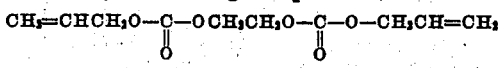

was obtained.

Example VI

The process described in Example V was repeated using an equivalent amount of tetraethylene glycol in lieu of ethylene glycol. The ester thus secured was a colorless liquid which had an index of refraction ($N_D^{20}$) of about 1.454, a density of 1.133 at 25° C. Polymerization of the material occured when distillation was attempted at 2 mm. pressure.

Example VII

The process described in Example V was repeated using an equivalent amount of diethylene glycol in lieu of ethylene glycol. The ester thus obtained was a colorless liquid which had an index of refraction of 1.449 at 20° C., a density of about 1.133 at 20° C./4° C. and a boiling point of about 166° C. at 2 mm. pressure.

Example VIII

A quantity of polyvinyl alcohol was dissolved by heating with about ten times its weight of pyridine for 16 hours at 85° C. The solution was cooled to about 0° C. and mixed with cold allyl chloroformate while maintaining the temperature at 5 to 7° C. The mixture was stirred, warmed to 40° C. and poured into water slightly acidified with hydrochloric acid. A white sticky gum was precipitated. This gum was dissolved, reprecipitated with water from acetone solution and a tough, white polymer was obtained. This product cured to an infusible, insoluble state upon heating with 5 percent benzoyl peroxide.

Example IX

Pentaerythritol tetrakis (methallyl carbonate) was prepared by treating 100 gms. of pentaerythritol with 475 gms. of methallyl chloroformate in the presence of 302 gms. of pyridine. The reaction was conducted at temperatures between 5 and 15° C. by adding the chloroformate slowly to a mixture of the other reagents. When the reaction was completed the mixture was permitted to warm to room temperature and was washed with dilute hydrochloric acid and twice with water and dried over calcium chloride.

A 2 gm. portion of the ester polymerized to a hard transparent solid by heating to 140° C. with 3 percent benzoyl peroxide. The monomer has the following structure:

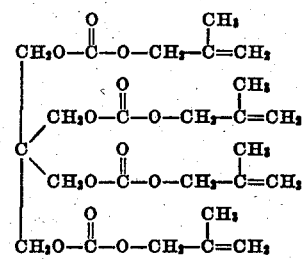

Example X

A fifty-gram sample of erythritol was mixed with 200 cc. of dioxane and treated with an excess of phosgene at a temperature between −5 and +5° C. by cooling with an acetone-dry ice mixture. The tetrachloroformate of erythritol was produced and separated from the dioxane, by heating in a vacuum. The chloroformate was then treated with 100 gms. of allyl alcohol and 150 gms. of pyridine at a temperature between 5 and 15° C. as in previous examples. The ester was washed with dilute HCl and with dilute Na₂CO₃. A five gram sample was heated with 5 percent benzoyl peroxide and a hard, brittle translucent solid was produced.

Example XI

One-half mole of resorcinol (55 gms.), 80 gms. of pyridine and 200 cc. of dioxane were placed in a one-liter flask equipped with a continuous stirrer and provided with an ice bath. 120 gms of allyl chloroformate were added over a period of one hour. The addition was begun at a very slow rate and speeded up toward the end of the reaction to maintain the temperature of the reactants between +5 and 15° C. The mixture was washed with water and heated under reduced pressure to evaporate the solvent. The unsaturated ester was believed to have the following structure:

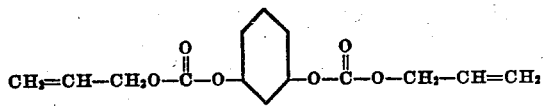

A ten gram sample was heated with 3 percent benzoyl peroxide for 1½ hours to produce a polymer.

Example XII 100 gms. of resorcinol was mixed with 350 cc. of carbon tetrachloride. Phosgene was bubbled through the mixture at a rate of 25–35 millimoles per minute until the reaction was completed. The dichloroformate of resorcinol in solvent was washed with dilute HCl and water. The solution was cooled to +5° C. on an ice bath. While the temperature was maintained between +5 and +15° C., a mixture of 150 gms. of pyridine and 135 gms. of methallyl alcohol was prepared and the chloroformate solution was added at the rate of 5 cc. per minute. The mixture was washed with water to remove the excess alcohol. The product was a solution of the ester:

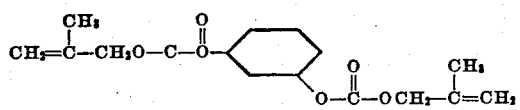

in carbon tetrachloride.

A quantity of lauroyl peroxide (2 percent based on the theoretical yield of the ester) was added and the mixture was heated at 50° C. for four hours. The viscous solution was poured into 1000 cc. of methyl alcohol and a substantial quantity of soft gummy polymer was precipitated. The polymer was separated and dried.

A ten gram sample of the fusible polymer with 5 percent benzoyl peroxide was pressed in a mold at 125° C. for an hour. A hard brittle polymer was produced.

Example XIII

One mole (126 gms.) of pyrogallol was dissolved in 300 cc. of carbon tetrachloride. To this solution 250 gms. of pyridine was then added. Three moles of allyl chloroformate were slowly added to the mixture while stirring vigorously. The reaction mass was maintained below 20° C. by cooling on an ice bath. When the reaction was completed the mixture was washed with very dilute HCl and water. The solvent was removed by evaporation under reduced pressure. The unsaturated ester

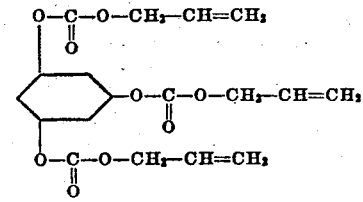

was produced in substantial quantities.

A five gram sample of the crude ester was heated to 150° C. for 2 hours with 5 percent acetone peroxide. A viscous polymer was produced.

Example XIV

The precedure of Example XII was repeated using catechol in place of resorcinol. The following ester was produced:

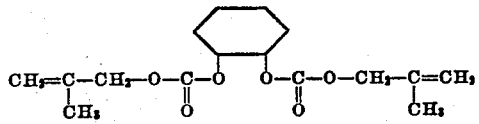

A ten gram sample was heated at 75° C. for 2 hours to form a slightly yellowish polymer.

Example XV 200 grams of the monomer produced in Example I was mixed with 5 percent benzoyl peroxide and heated at 60° C. for 3 hours. The ester increased in viscosity to about 600 percent of the normal monomer viscosity.

A mold was prepared with two sheets of polished plate glass (15" x 15") separated about ¼" with a ½" x ¼" x 54" strip of soft flexible Thiokol. The flexible retainer was located about one inch from the edges of the glass and held in place by clamps placed 3" apart around the periphery of the assembly. The ends of the flexible strip were about 2 inches apart at one corner.

The mold was placed in a vertical position and filled with thickened monomer, through the opened corner. After standing for 15 minutes to permit the separation of entrapped air bubbles, the filled mold was placed in an oven and heated for 4 hours at 70° C. The clamps were then tightened to restore the pressure lost due to the shrinkage and the heating continued for 2 hours after which the clamps were again tightened. After 8 and 10 hours total lapsed time the tightening procedure was repeated. The mold was removed at the end of 12 hours and the glass plates separated. A transparent sheet of polymer having polished surfaces and high tensile strength was produced.

Although the present invention has been described with respect to certain specific modifications, it is not intended that the details of such modifications shall be limitations upon the invention except as incorporated in the following claims.

We claim:
1. Resorcinol bis (allyl carbonate).
2. Catechol bis (methallyl carbonate).
3. A polymer of resorcinol bis (allyl carbonate).
4. A polymer of catechol bis (methallyl carbonate).
5. An ester having the following structural formula:

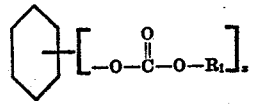

wherein $R_1$ is a radical equivalent to the radical $R_1$ in the alcohol $R_1OH$, said alcohol being a monohydric, unsaturated aliphatic alcohol containing from 3 to 10 carbon atoms and having an unsaturated carbon-to-carbon linkage between the beta and gamma carbon atoms therein, and $x$ is a small whole number greater than one and less than four.

6. The compound of claim 5 wherein $R_1$ is the allyl radical.

7. The compound of claim 5 wherein $R_1$ is the methallyl radical.

8. The compound of claim 5 wherein $R_1$ is the 2-chloroallyl radical.

9. A polymer of the compound of claim 5.

IRVING E. MUSKAT.
FRANKLIN STRAIN.